United States Patent

Meeker

[11] Patent Number: 5,874,033
[45] Date of Patent: Feb. 23, 1999

[54] PROCESS FOR PREPARING A LAMINAR STRUCTURE

[75] Inventor: Brian L. Meeker, Maumee, Ohio

[73] Assignee: Owens Corning Fiberglas Technology, Inc., Summit, Ill.

[21] Appl. No.: 796,074

[22] Filed: Feb. 5, 1997

[51] Int. Cl.⁶ ................................................... B32B 31/20
[52] U.S. Cl. .......................... 264/138; 156/222; 156/245; 264/257; 264/258; 264/324; 264/325
[58] Field of Search ..................................... 264/163, 257, 264/258, 324, 322, 325; 156/222, 245, 221, 242, 138

[56] References Cited

U.S. PATENT DOCUMENTS

| | | | |
|---|---|---|---|
| 2,859,795 | 11/1958 | Greig | 264/258 |
| 3,850,723 | 11/1974 | Ackley | 264/258 |
| 3,939,024 | 2/1976 | Hoggatt | 264/258 |
| 4,035,215 | 7/1977 | Goldstone | 156/245 |
| 4,385,955 | 5/1983 | Doerfling et al. | 264/258 |
| 4,416,716 | 11/1983 | Ichikawa et al. | 156/245 |
| 4,432,822 | 2/1984 | Adams et al. | 156/245 |
| 4,474,635 | 10/1984 | Adams | 156/245 |
| 4,581,272 | 4/1986 | Walters et al. | 156/245 |
| 4,692,199 | 9/1987 | Kozlowski et al. | 264/324 |
| 5,007,976 | 4/1991 | Satterfield et al. | 264/258 |
| 5,068,001 | 11/1991 | Haussling | 156/222 |
| 5,185,118 | 2/1993 | Siano | 264/324 |
| 5,207,963 | 5/1993 | Grace | 264/324 |
| 5,413,661 | 5/1995 | Spengler et al. | 264/258 |
| 5,549,776 | 8/1996 | Juriga | 264/258 |
| 5,591,289 | 1/1997 | Souders et al. | 264/258 |
| 5,626,704 | 5/1997 | Bowers, Jr. et al. | 156/245 |

Primary Examiner—Mathieu D. Vargot
Attorney, Agent, or Firm—C. Michael Gegenheimer

[57] ABSTRACT

A process of making a molded laminar structure from a reinforced fibrous mat impregnated with an uncured thermal setting resinous binder wherein the mat is compressed and molded, the binder cured to form a shell, a covering secured to one surface of the shell to form a laminar structure, and trimming the laminar structure to predetermined dimensions.

18 Claims, 5 Drawing Sheets

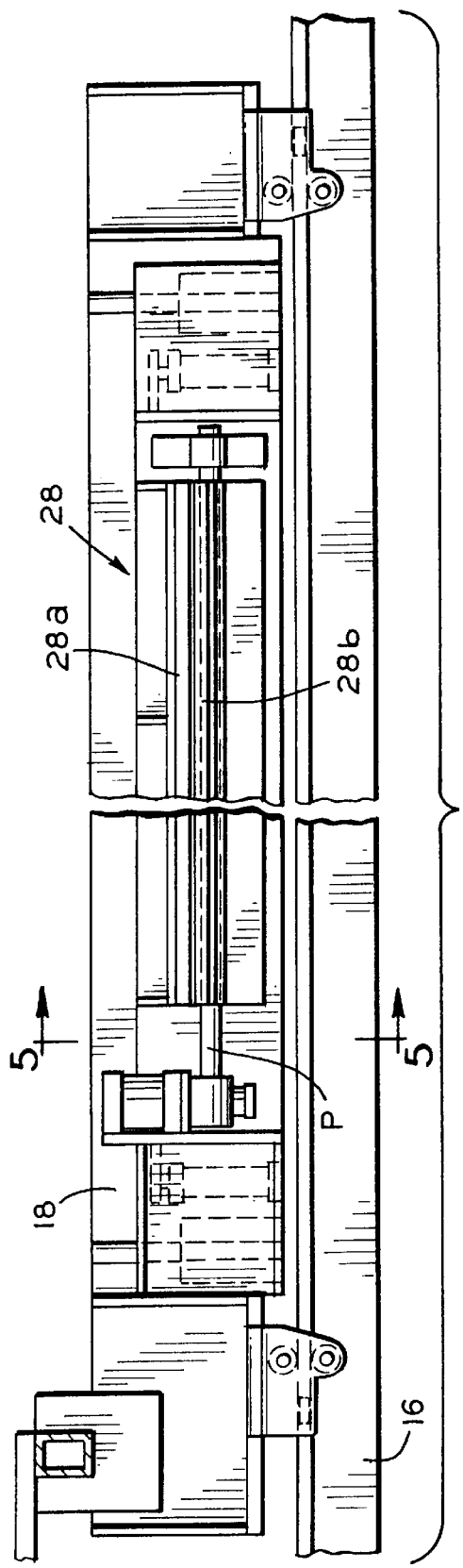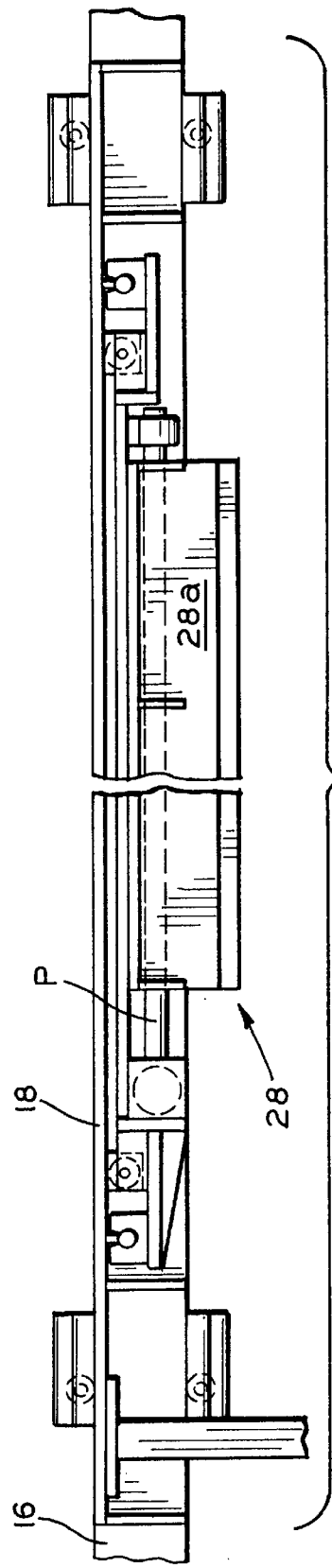
FIG. 3
FIG. 4

PROCESS FOR PREPARING A LAMINAR STRUCTURE

FIELD OF THE INVENTION

This invention relates generally to a laminar structure including a mat of resin cured fibrous material and a fabric covering secured to one surface and a process and apparatus for preparing the same.

BACKGROUND OF THE INVENTION

It is well known to use fibrous material and more especially fiber glass material for sound and heat energy insulation. Also, it is well known to use fibers of glass for strengthening a laminar structure due to the high tensile strength of glass fibers which cause the resultant structure to become more rigid.

Resin impregnated fibrous glass mats are often used to stiffen a composite layer of a molded automotive vehicle headliner structure so that the headline will resist any tendency to sag or otherwise deform due to the effect of gravity over the life of the associated vehicle.

It would be desirable to produce such a fiber glass structure having a decorative fabric covering applied to the exposed surface of the headliner structure which could be molded to a desired configuration and trimmed to predetermined dimensions prior to being installed in a vehicle.

SUMMARY OF THE INVENTION

Accordant with the present invention, there has been discovered a laminar structure suitable for use as a vehicle headliner and a process and apparatus for preparing the same. The process comprises the steps of:

providing a fibrous mat impregnated with an uncured resin and having a reinforcement sheet on top, bottom or both sides;

directing the composite into a heated molding press;

causing the heated press to compress the fibrous mat and to cure the resin and bond the reinforcement to produce a dimensionally stable reinforced fibrous shell;

directing the reinforced shell to a laminating station;

applying a fabric covering the one surface of the reinforced shell;

directing the reinforced shell and the fabric covering to a laminating press to cause the fabric covering to become secured to the one surface of the reinforced fibrous shell to produce a finished laminar structure;

directing the laminar structure to a trimming station and trimming the laminar structure to predetermined dimensions; and unloading the trimmed laminar structure.

The invention further contemplates a molded laminar product containing a reinforced fibrous mat impregnated with a cured resin binder and a decorative fabric adhesively secured to one surface of the reinforced fibrous mat.

The invention is also directed to the apparatus for preparing the molded laminar structure mentioned hereinabove.

The laminar product, the process, and the apparatus for preparing the laminar product are particularly useful for manufacturing and producing molded vehicular headliners, as well as other, readily moldable decorative panel members.

Further objects and advantages of the invention will become readily apparent to those skilled in the art from reading the following detailed description of a preferred embodiment of the invention when considered in the light of the accompanying drawings.

BRIEF DESCRIPTION OF THE DRAWINGS

FIG. 3 is an enlarged fragmentary elevational view of the side grippers of the carriages illustrated in FIGS. 1 and 2;

FIG. 4 is a top plan view of the side grippers illustrated in FIG. 3;

DETAILED DESCRIPTION OF THE PREFERRED EMBODIMENT

Figure 1:
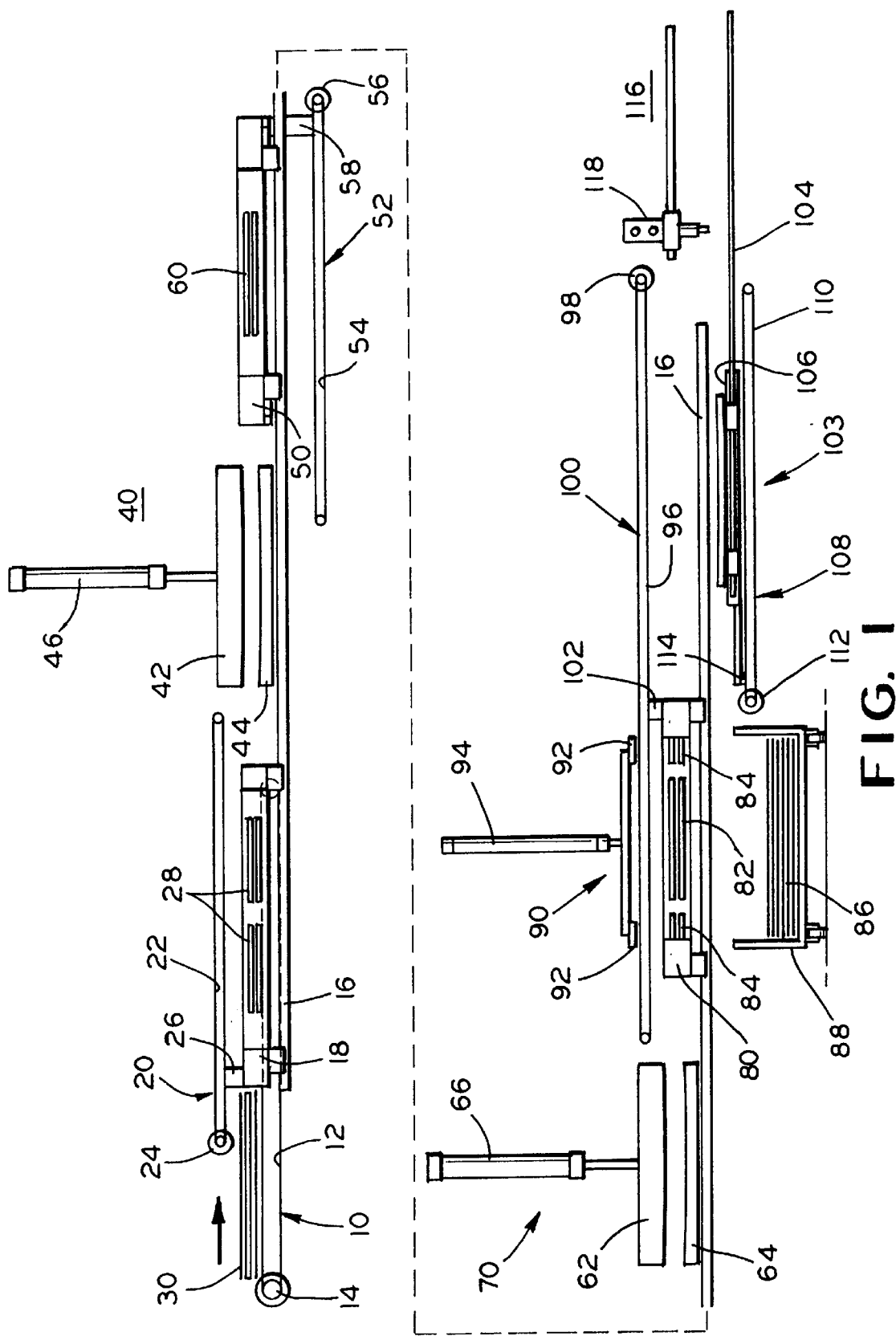
FIG. 1 is a schematic elevational illustration of apparatus embodying the features of the invention for carrying out the inventive process for producing the laminar structure of the invention.
Figure 2:
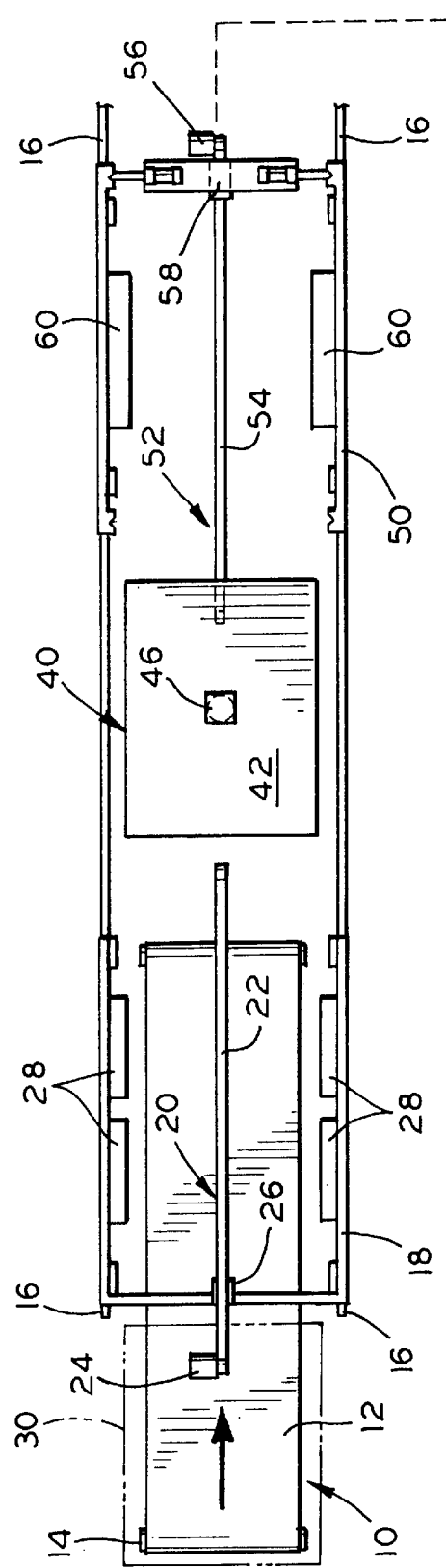
FIG. 2 is a top plan view of the apparatus illustrated in FIG. 1.
Figure 2:
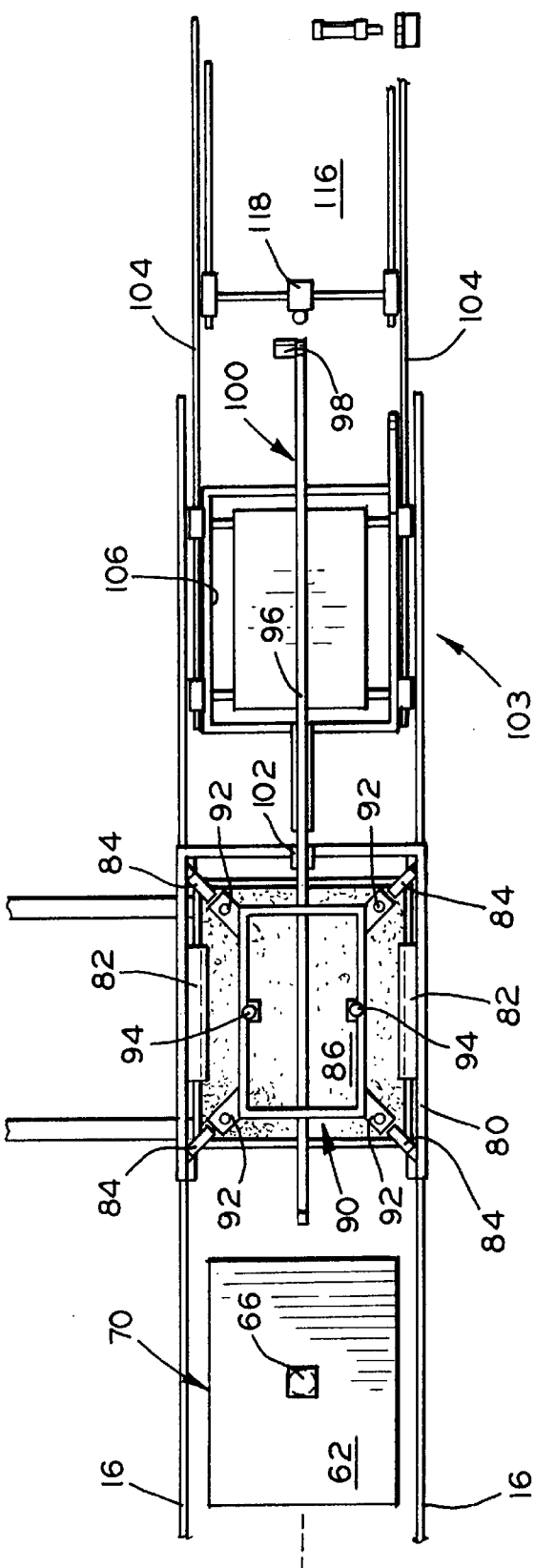

Referring to the drawings wherein like reference numerals refer to like parts throughout the description, there is illustrated in FIGS. 1 and 2 a schematic representation of an apparatus for making a molded laminar structure containing a mat of fibrous material, such as fiber glass for example, impregnated with a resin binder, a reinforcement therefor, and an adhesively secured fabric covering a surface thereof. The structure is particularly useful in forming headliners for vehicular bodies.

The apparatus contains, at the entry end thereof, a first conveyor 10 including an endless conveyor belt 12 and an associated conveyor drive mechanism 14 for supporting and imparting selective to and fro movement to the belt 12.

A pair of spaced apart track members 16 is disposed to extend longitudinally downstream of the conveyor 10 for the entire length of the apparatus. The track members 16 are disposed outboard of the conveyor 10 and are adapted to support a carriage 18 for to and fro movement. A linear drive 20 is employed to impart movement to the carriage 18. The drive 20 is coupled to the carriage 18 and includes an endless conveyor belt 22 and an associated conveyor drive mechanism 24 for supporting and imparting selective to and fro movement to the belt 22.

The carriage 18 is coupled to the conveyor assembly 22 by a coupling 26. The coupling 26 transmits the movement of the conveyor belt 22 to the carriage 18. Therefore, it will be readily apparent that the reversible motor of the drive mechanism 24 can effectively cause to and fro movement of the carriage 18 as will be explained in greater detail hereinafter.

The opposing sides of the carriage 18 are provided with side clamps 28 which are employed to clamp opposing edges of the fiber glass mat and reinforcement 30 as it is conveyed by the conveyor belt 12 of the conveyor 10 to a position between the sides of the carriage 18 wherein the opposing side edge portions of the mat 30 are gripped or grasped by the clamps 28.

An important aspect of the present invention resides in the ability of the process to produce a laminated fibrous composite finished product suitable for a myriad of end uses. Amongst the more manifest uses of the finished product is as vehicular headliners and sun roofs. Such products may require differing zones of reinforcement. For example, in certain applications the entire product may require reinforcement, while other applications may require only selected zones of reinforcement. The selected zones of reinforcement include reinforcement along the marginal peripheral edges; or reinforcement of only at spaced apart zones across the face of the product. The instant invention enables such selective reinforcement to be readily achieved by the simple disposition of the reinforcement material on the desired position on one surface of the fibrous mat 30 prior to introduction thereof to the heated molding press 40. Particularly, satisfactory results are achieved by utilizing a layer of reinforcements such as glass fiber containing polymer sheet including first and second polymer sheets fused together to form a fusion zone therebetween and a layer of glass fibers encapsulated within the fusion zone.

The next station of the apparatus includes a heated molding press 40 having a pair of cooperating upper and lower forming members 42 and 44, respectively. In the illustrated embodiment, the upper member 42 is caused to selectively move upwardly and downwardly in respect of the lower member 44 by a hydraulically powered motor means 46. The members 42 and 44 of the press 40 may satisfactorily be heated by electrically energized heating elements (not shown). The temperature necessary for curing the resinous binder may vary over a wide range from about 350° F. to about 550° F. depending upon the particular binder and curing time used. A commercial phenol formaldehyde resinous binder, for example, may be fully cured at a temperature of about 425° F. while maintained in the press for less than thirty seconds. Other resins which could satisfactorily be used include melamine, epoxy, polyester and mixtures thereof.

A second carriage 50, similar to the first carriage 18, is mounted for to and fro movement on the tracks 16 on the side of the press 40 opposite that of the carriage 18. A conveyor 52 is employed to impart movement to the carriage 50. The conveyor 52 includes an endless belt 54 and an associated conveyor drive mechanism 56 for supporting and imparting selective to and fro movement to the belt 54.

The carriage 50 is coupled to the conveyor belt 54 by a coupling 58. The coupling 58 transmits the movement of the conveyor belt 54 to the carriage 50. Therefore, it will be apparent that the reversible motor of the drive mechanism 56 can effectively cause selective to and fro movement of the carriage 50 as will be explained hereinafter. The coupling 58 may be selectively affixed at either the leading end of the carriage 50, as shown in FIG. 2 or may be attached at the trailing edge.

The coupling 58 includes a pair of oppositely extending pressure fluid operated motors capable of selectively extending or retracting plunger elements which, in the extended position, connect with associated coupling notches formed on the inner facing surfaces of the leading and trailing ends of the carriage 50.

The opposing sides of the carriage are provided with side clamps 60 which are employed to clamp opposing sides of the fiber glass part molded in the press 40 to then convey the molded part or shell as the carriage 50 is moved by the conveyor belt 54 of the conveyor 52 to the position illustrated in FIG. 1. At this point in the operation, the coupling 58 is uncoupled from the leading edge of the carriage 50, as illustrated in FIG. 2 by retraction of the plunger elements. The drive mechanism 56 is then reversed and causing the conveyor belt 54 to move the coupling 58 to the trailing edge of the carriage 50 where the plunger elements are once again extended to engage with the notches formed on the facing inner surfaces of the trailing end of the carriage 50.

Thereafter, the drive mechanism 56 is reversed and causes the conveyor belt 54 to move in a direction conveying the carriage 50 and the molded fiber glass shell on the tracks 16 to a position enabling the shell to be positioned between the cooperating upper and lower die members 62 and 64, respectively, of a hydraulically operated laminating press 70. In the illustrated embodiment, the upper member 62 is caused to move upwardly or downwardly in respect of the lower member 64 by a hydraulically powered motor 66. The upper and lower members 62 and 64 of the press 70 may be satisfactorily heated by electrically energized heating elements.

Upon proper orientation between the cooperating die members 62 and 64 of the laminating press 70, the side clamps 60 are caused to release the shell to a position of rest upon the lower die member 64.

A third carriage 80, similar to the carriages 18 and 50, is mounted for to and fro movement on the tracks 16 upstream of the laminating press 70. The carriage 80 is provided with side clamps 82 and four corner clamps 84. The side clamps 82 are similar to the previously mentioned side clamps 28 and 60 of the carriages 18 and 50, respectively. The corner clamps 84 are capable of opening and closing, and extending and retracting to effectively grasp and stretch a decorative facing fabric 86 from a supply 88 disposed therebelow.

A vacuum operated fabric pick-up mechanism 90 is disposed above the tracks 16. The mechanism 90 includes an array of spaced apart vacuum pads 92 which may be moved upwardly or downwardly in unison by a pair of spaced apart hydraulically powered motor 94. The array of vacuum pads 92 is designed to be moved vertically between the sides of the carriage 80 by the motor 94 and lowered until the pads 92 are able to contact and then hold, by vacuum, a single laminate of the fabric 86 from the supply 88. The fabric 86 is then lifted upwardly to a position within the confines of the carriage 80, whereupon the corner clamps 84 are caused to extend and grasp the corners of the fabric 86 and then retract to cause the fabric to become stretched.

A linear drive 100 is employed to impart movement to the carriage 80. The drive 100 includes an endless belt 96 and an associated conveyor drive mechanism 98 for supporting and imparting selective to and fro movement to the belt 96.

The carriage 80 is coupled to the conveyor belt 96 by a coupling 102. The coupling 102 transmits movement of the conveyor belt 96 to the carriage 80. Therefore, it will be appreciated that the reversible motor of the drive mechanism 98 can effectively cause selective to and fro movement of the carriage 80.

Accordingly, after the fabric 86 is suitably grasped and stretched to the desired amount by the corner clamps 84, and the pick-up mechanism has moved at least to the position illustrated in FIG. 1, the conveyor 100 is actuated to move the carriage 80 and the associated stretched fabric 86 into registry with the lower laminating die 64 of the laminating press 70. The hydraulically powered motor 66 is caused to close the dies 62 and 64 to accomplish the desired lamination of the fabric 86 to the exposed upper face of the molded shell therein.

It has been found that satisfactory results can be achieved by applying a thermoplastic adhesive to the fabric 86 such that when the dies 62 and 64 are heated to the desired temperature, the adhesive in the fabric 86 will effect a bond with the molded shell.

After the fabric 86 has been suitably adhered to the molded shell within the laminating press 70, the motor 66 is actuated to separate the die members 62 and 64, and the drive mechanism 98 of the linear drive 100 is energized to move the associated conveyor belt 96 in a fashion to move the carriage 80 on the tracks 16, past the fabric pick-up mechanism 90 to a drop station 103.

The drop station 103 includes a pair of spaced apart tracks 104 suitable for providing for to and fro movement of an associated buck 106. With particular reference to FIG. 2, a conveyor 108 is employed to effect selective to and fro movement of the buck 106. The conveyor 108 includes an endless conveyor belt 110 and an associated conveyor drive mechanism 112 for supporting and imparting selective to and fro movement to the belt 110.

A coupling 114 is employed to couple the buck 106 to the belt 110. The coupling 114 transmits the movement of the belt 110 to the buck 106. It will be apparent that the reversible motor of the drive mechanism 112 can effectively cause to and fro movement of the buck 106 on the tracks 104.

When the carriage 80 is immediately over the buck 106 of the drop station 103, the side clamps 82 and the corner clamps 84 are opened to release the laminated molded part which falls by gravity on to the buck 106.

The buck 106 and the associated part are moved to a trim station 116 where the laminated molded part is locked in place and a water jet cutter 118 is adapted to transverse a predetermined outer pattern to remove unwanted excess material. After the part is trimmed, the drive mechanism 112 causes the conveyor belt 110 to return the buck 106, carrying the finished part, to the drop station 102 where the part is off loaded, preparatory to being delivered by suitable means to a shipping department.

Figure 5:
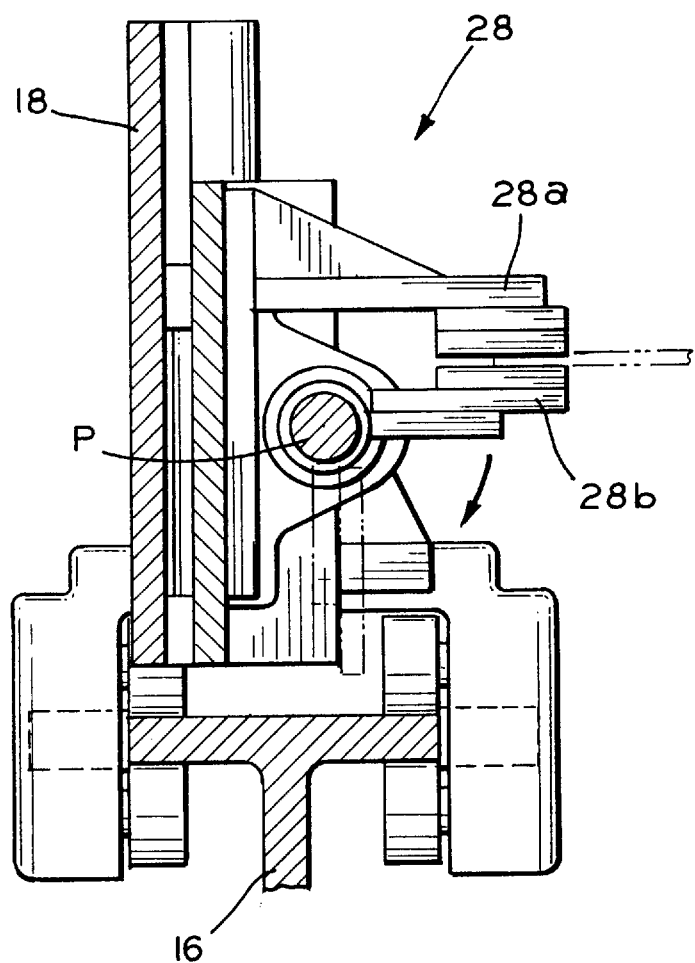
FIG. 5 is a sectional view of the side grippers taken along line 5—5 of FIG. 3.

The side clamps 28, 60, and 82 basically include the same mechanism. FIGS. 3, 4, and 5 illustrate the side clamps 28 of the carriage 18 and are deemed exemplary of the others. It will be noted that the upper portion 28a of the clamping mechanism is typically maintained stationary, while the lower portion 28b can be selectively pivotally opened and closed by moving the same about the pivot axis P.

The corner clamps 84 of the carriage 80 are provided with cooperating jaws which may be selectively opened to grasp a corner of the covering material 86 and may then, typically in unison, be retracted to cause the material 86 to become taut prior to the lamination thereof to the shell.

Figure 6:
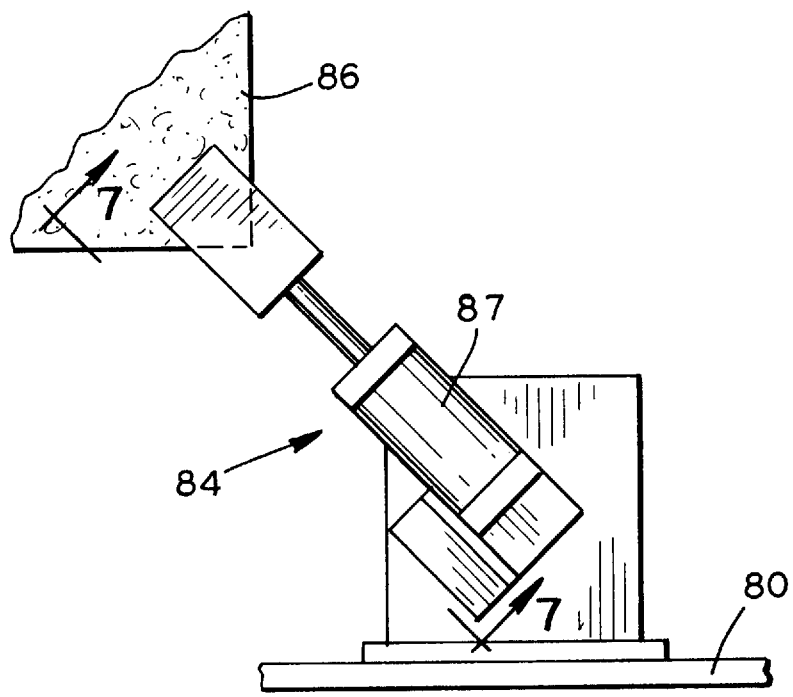
FIG. 6 is a fragmentary top plan view of one of the corner clamps illustrated in FIGS. 1 and 2.
Figure 7:
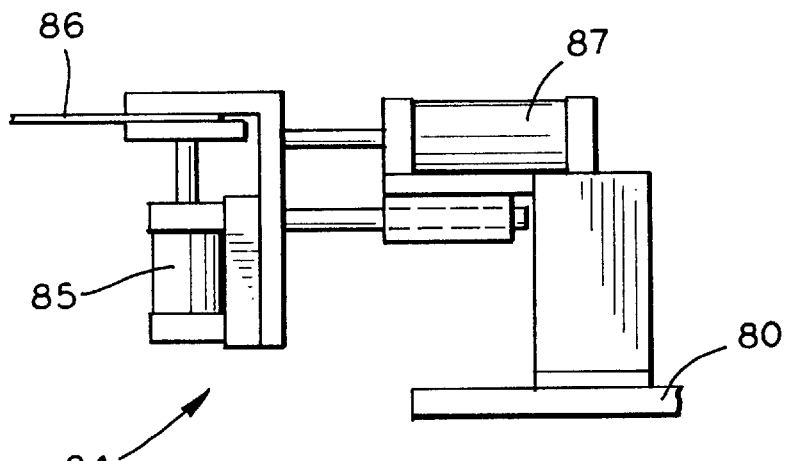
FIG. 7 is a sectional view of the corner clamp illustrated in FIG. 6 taken along line 7—7 thereof.

The jaws of the clamps 84 may be operated to open and close by a power fluid actuated motor 85, which, in the embodiment illustrated in FIGS. 6 and 7, is operative to cause relative movement of the jaws of the clamp 84 by effecting vertical movement of the lowermost jaw relative to the facing surface of the upper jaw.

The jaws of the clamps 84 may be selectively moved in a horizontal plane by a power fluid actuated motor 87 which is mounted on the associated carriage 80. The horizontal movement of the clamps 84, as mentioned earlier in the description, is effective to cause the covering material 86 to become taut prior to being laminated to the previously formed shell.

The process of the invention surprisingly produces a laminated structure having characteristics superior to similar structures of the prior art. Furthermore, while the laminated structure produced by the process is extremely useful for use in vehicular headliners, it must be appreciated that the laminated structure could be used in many other environments. It will be apparent to those skilled in the art that various changes can be made in the illustrated embodiment and the invention may be practiced otherwise than as specifically illustrated and described.

Mention has been made throughout the foregoing description of the use of a fibrous mat formed of fibers of glass. However, it will be appreciated that other fibrous material could be utilized as well. For example, satisfactory results can be obtained by using a fibrous mat formed of a thermal plastic material such as polyesters, polyamides, polycarbonates, polyurethanes, ABS resins, and polyoxyalkylenes.

In the preferred embodiment of the invention, the molded laminar structure includes a mat of fibrous material, such as fiber glass for example, impregnated with an uncured resin; a layer of reinforcement such as a glass fiber containing polymer sheet including first and second polymer sheets fused together to form a fusion zone therebetween and a layer of glass fibers encapsulated within the fusion zone; and a separate fabric applied to one surface of the mat after the mat and reinforcement are bonded together through the curing of the impregnated resin. However, it must be understood that the laminar structure and the process for making the laminar structure could incorporate the reinforcement and the fabric. In such an embodiment the fiber which typically is disposed on the surface of the finished laminar structure which is adapted to be viewed or exposed in use, could be formed of a combined decorative fabric having reinforcing characteristics or a reinforcement having decorative characteristics.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. Process for producing a molded laminar structure including the steps of:
   1) providing a composite fibrous mat impregnated with an uncured resin having reinforcement disposed selectively on at least one surface thereof;
   2) directing the composite fibrous mat to a heated molding press station;
   3) causing the heated molding press station to compress the composite fibrous mat and the reinforcement to cure the resin to bond the mat and the reinforcement to produce a dimensionally stable reinforced fibrous shell;
   4) directing the reinforced shell to a laminating station;
   5) applying a fabric to one surface of the reinforced shell;
   6) directing the reinforced shell and the fabric to a laminating press to cause the fabric to be adhesively secured to the one surface of the reinforced shell to produce a finished laminar structure;
   7) directing the finished laminar structure to a trimming station and trimming the laminar structure to predetermined dimensions; and
   8) unloading the trimmed laminar structure from the trimming station.

2. The process defined in claim 1 wherein the fibrous mat includes fibrous material selected from the group consisting of glass, polyester, polyamides, polycarbonates, polyurethanes, ABS resins, and polyoxyalkylenes.

3. The process defined in claim 1 wherein the fibrous mat is impregnated with a thermal setting polymer.

4. The process defined in claim 3 wherein the thermal setting polymer is a phenolic resin.

5. The process defined in claim 1 wherein said heated molding press station includes a pair of cooperating die members.

6. The process defined in claim 5 wherein the die members are movable toward and away from one another.

7. The process defined in claim 5 wherein at least one of the die members is heated.

8. The process defined in claim 5 wherein the die members include facing surfaces which cooperate to form a cavity of a predetermined configuration.

9. The process defined in claim 1 wherein the fibrous mat is directed to the heated press station by a carriage having selectively operable clamping means for grasping at least a portion of a marginal edge of the fibrous mat.

10. The process defined in claim 9 wherein the movement of the carriage is guided by spaced apart tracks.

11. The process defined in claim 10 wherein the movement of the carriage is effected by selected coupling to an endless driven conveyor belt.

12. The process defined in claim 1 wherein said laminating station includes a pair of cooperating press members.

13. The process defined in claim 12 wherein the press members of said laminating station are relatively movable toward and away from one another.

14. The process defined in claim 13 wherein the press members are provided with cooperating facing surfaces.

15. The process defined in claim 14 wherein the facing surfaces of the press members cooperate to form a cavity of a predetermined configuration.

16. The process defined in claim 12 wherein the fabric covering is applied to the surface of the reinforced shell by a vacuum operated mechanism capable of moving the covering from a supply thereof, thereafter grasping the fabric and causing the fabric to become taut, and placing the taut fabric on the one surface of the reinforced shell.

17. The process defined in claim 1 wherein the trimming of the finished laminar structure includes the step of directing a water jet cutter to form the laminar structure to the predetermined dimensions.

18. The process defined in claim 1 wherein the uncured resin is selected from the group consisting of phenol-formaldehyde, melamine, epoxy, and polyester resins, and mixtures thereof.

* * * * *